US009051458B2

(12) United States Patent
Berthold et al.

(10) Patent No.: US 9,051,458 B2
(45) Date of Patent: *Jun. 9, 2015

(54) MULTIMODAL POLYETHYLENE MOLDING COMPOSITION FOR PRODUCING PIPES HAVING IMPROVED MECHANICAL PROPERTIES

(75) Inventors: Joachim Berthold, Kelkheim (DE); Hansjörg Nitz, Frankfurt (DE); Werner Rothhöft, Liederbach (DE); Heinz Vogt, Frankfurt (DE)

(73) Assignee: Basell Polyolefine GmbH, Wesseling (DE)

( * ) Notice: Subject to any disclaimer, the term of this patent is extended or adjusted under 35 U.S.C. 154(b) by 65 days.

This patent is subject to a terminal disclaimer.

(21) Appl. No.: 11/990,651

(22) PCT Filed: Aug. 17, 2006

(86) PCT No.: PCT/EP2006/008101
§ 371 (c)(1),
(2), (4) Date: Feb. 19, 2008

(87) PCT Pub. No.: WO2007/022908
PCT Pub. Date: Mar. 1, 2007

(65) Prior Publication Data
US 2009/0105422 A1 Apr. 23, 2009

Related U.S. Application Data

(60) Provisional application No. 60/717,571, filed on Sep. 15, 2005.

(30) Foreign Application Priority Data

Aug. 25, 2005 (DE) .......................... 10 2005 040 390

(51) Int. Cl.
C08L 23/06 (2006.01)
C08F 10/00 (2006.01)
C08F 10/02 (2006.01)
C08F 110/02 (2006.01)
C08F 210/16 (2006.01)
C08L 23/08 (2006.01)

(52) U.S. Cl.
CPC ................. C08L 23/06 (2013.01); C08F 10/00 (2013.01); C08F 10/02 (2013.01); C08F 110/02 (2013.01); C08F 210/16 (2013.01); C08L 23/08 (2013.01); C08L 23/0807 (2013.01); C08L 2205/03 (2013.01)

(58) Field of Classification Search
CPC .... C08L 2205/03; C08L 23/08; C08L 210/16
USPC ........... 525/290, 293, 240, 291, 324; 526/352
See application file for complete search history.

(56) References Cited

U.S. PATENT DOCUMENTS

| 4,336,352 | A | 6/1982 | Sakurai et al. |
|---|---|---|---|
| 4,447,587 | A | 5/1984 | Berthold et al. |
| 4,461,873 | A | 7/1984 | Bailey et al. |
| 4,536,550 | A | 8/1985 | Moriguchi et al. |
| 5,189,106 | A | 2/1993 | Morimoto et al. |
| 5,258,161 | A | 11/1993 | Ealer |
| 5,338,589 | A | 8/1994 | Böhm et al. |
| 5,350,807 | A | 9/1994 | Pettijohn et al. |
| 5,405,922 | A | 4/1995 | DeChellis et al. |
| 5,422,400 | A | 6/1995 | Kamiyama et al. |
| 5,503,914 | A | 4/1996 | Michie et al. |
| 5,648,309 | A | 7/1997 | Böhm |
| 5,663,236 | A | 9/1997 | Takahashi et al. |
| 5,684,097 | A | 11/1997 | Palmroos et al. |
| 5,882,750 | A | 3/1999 | Mink et al. |
| 5,908,679 | A | 6/1999 | Berthold et al. |
| 5,925,448 | A | 7/1999 | Moy et al. |
| 6,084,048 | A | 7/2000 | Hozumi et al. |
| 6,136,924 | A | 10/2000 | Promel |
| 6,180,736 | B1 | 1/2001 | Muhle et al. |
| 6,185,349 | B1 | 2/2001 | Dammert et al. |
| 6,221,982 | B1 | 4/2001 | Debras et al. |
| 6,225,410 | B1 | 5/2001 | Sugimura et al. |
| 6,242,548 | B1 | 6/2001 | Duchesne et al. |
| 6,291,590 | B1 | 9/2001 | Sainio et al. |
| 6,329,054 | B1 | 12/2001 | Rogestedt et al. |
| 6,407,185 | B1 | 6/2002 | Promel |
| 6,423,808 | B1 | 7/2002 | Watanabe et al. |
| 6,433,095 | B1 | 8/2002 | Laurent |
| 6,441,096 | B1 | 8/2002 | Bäckman et al. |
| 6,455,638 | B2 | 9/2002 | Laughner et al. |
| 6,479,589 | B2 | 11/2002 | Debras et al. |
| 6,492,475 | B1 | 12/2002 | Egashira et al. |
| 6,509,106 | B1 | 1/2003 | Edwards et al. |
| 6,586,541 | B2 | 7/2003 | Citron |
| 6,635,705 | B2 | 10/2003 | Itoh et al. |
| 6,642,323 | B1 | 11/2003 | Myhre et al. |
| 6,645,588 | B1 | 11/2003 | Leiden et al. |
| 6,649,698 | B1 | 11/2003 | Mehta |
| 6,713,561 | B1 | 3/2004 | Berthold et al. |
| 6,770,341 | B1 | 8/2004 | Böhm |
| 6,777,498 | B2 | 8/2004 | Imai et al. |
| 6,787,608 | B2 | 9/2004 | Van Dun et al. |

(Continued)

FOREIGN PATENT DOCUMENTS

DE 19945980 3/2001
DE 10259491 7/2004

(Continued)

OTHER PUBLICATIONS

M. Fleißner, "Slow Crack Growth and Creep Rupture Strength of Polyethylene Pipe," Kuntstoffe German Plastics, vol. 77, p. 45-50 (1987) including English translation.

(Continued)

Primary Examiner — Mark Kaucher

(57) ABSTRACT

A polyethylene molding composition having a multimodal molecular mass distribution and comprising from 45 to 55% by weight of a low molecular weight ethylene homopolymer A, from 20 to 40% by weight of a high molecular weight copolymer B comprising ethylene and another olefin having from 4 to 8 carbon atoms and from 15 to 30% by weight of an ultrahigh molecular weight ethylene copolymer C can be prepared in the presence of a Ziegler catalyst in a three-stage process and is highly suitable for producing pipes having excellent mechanical properties.

4 Claims, No Drawings

(56) References Cited

U.S. PATENT DOCUMENTS

| | | |
|---|---|---|
| 6,803,418 B2 | 10/2004 | Kobayashi et al. |
| 6,900,266 B2 | 5/2005 | Raty |
| 7,101,939 B2 | 9/2006 | Nowlin et al. |
| 7,250,473 B2 | 7/2007 | Schramm et al. |
| 7,250,474 B2 | 7/2007 | Maziers |
| 7,416,686 B2 | 8/2008 | Äärilä et al. |
| 7,427,649 B2 | 9/2008 | Berthold et al. |
| 2001/0012562 A1 | 8/2001 | Nakagawa et al. |
| 2003/0036606 A1 | 2/2003 | Iizuka et al. |
| 2004/0048993 A1* | 3/2004 | Ishihama et al. ............ 526/160 |
| 2006/0052542 A1 | 3/2006 | Berthold et al. |
| 2006/0074193 A1 | 4/2006 | Berthold et al. |
| 2006/0074194 A1 | 4/2006 | Berthold et al. |
| 2008/0090968 A1 | 4/2008 | Berthold et al. |
| 2008/0139750 A1 | 6/2008 | Berthold et al. |
| 2008/0166535 A1* | 7/2008 | Berthold et al. ............ 428/220 |
| 2008/0199674 A1 | 8/2008 | Berthold et al. |
| 2008/0274353 A1 | 11/2008 | Vogt et al. |
| 2009/0105422 A1 | 4/2009 | Berthold et al. |

FOREIGN PATENT DOCUMENTS

| | | |
|---|---|---|
| EP | 68257 | 1/1983 |
| EP | 100843 | 2/1984 |
| EP | 401776 | 12/1990 |
| EP | 423962 | 4/1991 |
| EP | 436520 | 7/1991 |
| EP | 492656 | 7/1992 |
| EP | 603935 | 6/1994 |
| EP | 707040 | 4/1996 |
| EP | 739937 | 10/1996 |
| EP | 797599 | 10/1997 |
| EP | 848036 | 6/1998 |
| EP | 905151 | 3/1999 |
| EP | 1192216 | 4/2002 |
| EP | 1266738 | 12/2002 |
| WO | 91/18934 | 12/1991 |
| WO | 96/18677 | 6/1996 |
| WO | 97/03124 | 1/1997 |
| WO | 97/03139 | 1/1997 |
| WO | 00/01765 | 1/2000 |
| WO | 01/02480 | 1/2001 |
| WO | 01/23446 | 4/2001 |
| WO | 2004/056921 | 7/2004 |
| WO | 2004/058876 | 7/2004 |
| WO | 2004/058877 | 7/2004 |
| WO | 2004/058878 | 7/2004 |
| WO | WO 2004058876 A1 * | 7/2004 ............ C08L 23/04 |
| WO | 2006/053740 | 5/2006 |
| WO | 2006/053741 | 5/2006 |
| WO | 2006/092377 | 9/2006 |
| WO | 2006/092378 | 9/2006 |
| WO | 2006/095379 | 9/2006 |

OTHER PUBLICATIONS

L. Wild et al., "Crystallizability Distributions in Polymers: A New Analytical Technique", *Polym. Prep. A, Chem. Soc.—Polym. Chem. Div.*, vol. 18, p. 182 (1977).

ISO 16770:2004, International Standard, Plastics-Determination of environmental stress cracking (ESC) of polyethylene—Full-notch creep test (FNCT), First edition Feb. 1, 2004.

\* cited by examiner

MULTIMODAL POLYETHYLENE MOLDING COMPOSITION FOR PRODUCING PIPES HAVING IMPROVED MECHANICAL PROPERTIES

The present invention relates to a polyethylene molding composition which has a multimodal molecular mass distribution and is particularly suitable for producing pipes, and to a process for preparing this molding composition in the presence of a catalytic system comprising a Ziegler catalyst and a co-catalyst by means of a multistage reaction sequence comprising successive polymerization steps.

The expressions "polyethylene molding composition which has a multimodal molecular mass distribution" or simply "multimodal polyethylene" refer to a polyethylene molding composition or a polyethylene having a molecular mass distribution curve of multimodal configuration, i.e. a polyethylene comprising a plurality of ethylene polymer fractions each of them having distinct molecular weights. For example, according to a preferred embodiment of the present invention, a multimodal polyethylene can be prepared via a multistage reaction sequence comprising successive polymerization steps carried out under predetermined different reaction conditions in respective reactors arranged in series so as to obtain respective polyethylene fractions having different molecular weights. A process of this type can be performed in a suspension medium: in this case, monomers and a molar mass regulator, preferably hydrogen, are firstly polymerized in a first reactor under first reaction conditions in the presence of a suspension medium and a suitable catalyst, preferably a Ziegler catalyst, then transferred to a second reactor and further polymerized under second reaction conditions, and, if the polyethylene to be prepared is for example trimodal, further transferred to a third reactor and further polymerized under third reaction conditions, with the first reaction conditions differing from the second and third reaction conditions so as to obtain three polyethylene fractions having different molecular weights. This difference in molecular weight in the different ethylene polymer fractions is normally evaluated through the weight average molecular weight $M_w$.

Although Ziegler catalysts are particularly suitable for the preferred applications of the present invention, it is also possible to use other catalysts, for example catalysts having a uniform catalyst center (or "single site" catalysts), e.g. metallocene catalysts.

Polyethylene is used on a large scale for pipes for which a material having a high mechanical strength, a low tendency to undergo creep and a high resistance to environmental stress cracking is required. At the same time, the material has to be able to be processed readily and has to be organoleptically satisfactory for use as a pipe for drinking water.

Polyethylene molding compositions having a unimodal or monomodal molecular mass distribution, i.e. comprising a single ethylene polymer fraction having a predetermined molecular weight, have disadvantages either in respect of their processability or because of their environmental stress cracking resistance or their mechanical toughness.

In comparison, molding compositions having a bimodal molecular mass distribution represent a technical step forward. They can be processed more readily and, at the same density like an unimodal composition, have a far better environmental stress cracking resistance and a higher mechanical strength.

EP-A 739937 describes a pipe comprising such a molding composition which is based on polyethylene, has a bimodal molecular mass distribution, can be processed readily and nevertheless has good mechanical properties.

It was an object of the present invention to provide a molding composition which is based on polyethylene and has, while retaining a good processability with respect to its use as pipe raw material, an even better property combination of environmental stress cracking resistance, mechanical strength, specifically over a long period of time, and processing behavior.

This object is achieved by a polyethylene molding composition having a multimodal molecular mass distribution comprising from 45 to 55% by weight of a low molecular weight ethylene homopolymer A, from 20 to 40% by weight of a high molecular weight copolymer B comprising ethylene and another olefin having from 4 to 8 carbon atoms and from 15 to 30% by weight of an ultrahigh molecular weight ethylene copolymer C, where all percentages are based on the total weight of the molding composition.

The expressions "low molecular weight ethylene homopolymer A", "high molecular weight ethylene copolymer B" and "ultrahigh molecular weight ethylene copolymer C" refer to an ethylene homopolymer A, an ethylene copolymer B and an ethylene copolymer C, respectively, having different, increasing molecular weights.

The invention further relates to a process for preparing this molding composition in a cascaded suspension polymerization and pipes comprising this molding composition which have quite outstanding mechanical strength properties combined with a high stiffness.

The polyethylene molding composition of the invention has a density at a temperature of 23° C. in the range from 0.945 to 0.957 g/cm$^3$, preferably from 0.945 to 0.955 g/cm$^3$, more preferably from 0.948 to 0.955 g/cm$^3$, and a trimodal molecular mass distribution. The high molecular weight copolymer B comprises proportions of further olefin monomer units having from 4 to 8 carbon atoms, in an amount of from 1 to 8% by weight, based on the weight of the high molecular weight copolymer B. Examples of such co-monomers are 1-butene, 1-pentene, 1-hexene, 1-octene and 4-methyl-1-pentene. The ultrahigh molecular weight ethylene copolymer C likewise comprises one or more of the above-mentioned co-monomers in an amount in the range from 1 to 8% by weight, based on the weight of the ultrahigh molecular weight ethylene copolymer C.

These preferred amounts of comonomers make it possible to achieve an improved environmental stress cracking resistance. Within these preferred ranges, the polyethylene molding composition advantageously has a further improved combination of mechanical properties.

Furthermore, the molding composition of the invention has a melt flow index in accordance with ISO 1133, expressed as $MFI_{190/5}$, in the range from 0.1 to 0.8 dg/min, in particular from 0.1 to 0.5 dg/min, and a viscosity number $VN_{tot}$, measured in accordance with ISO/R 1191 in decalin at a temperature of 135° C., in the range from 200 to 600 cm$^3$/g, in particular from 250 to 550 cm$^3$/g, particularly preferably from 350 to 490 cm$^3$/g.

The trimodality as a measure of the position of the centers of gravity of the three individual molar mass distributions can be described by means of the viscosity numbers VN in accordance with ISO/R 1191 of the polymers formed in the successive polymerization stages. Here, attention should be paid to the following bandwidths of the polymers formed in the individual reaction stages:

The viscosity number $VN_1$ measured on the polymer after the first polymerization stage is identical to the viscosity number $VN_A$ of the low molecular weight polyethylene A and is, according to the invention, in the range from 50 to 120 cm$^3$/g, in particular from 60 to 100 cm$^3$/g.

The viscosity number $VN_2$ measured on the polymer after the second polymerization stage does not correspond to $VN_B$ of the relatively high molecular weight polyethylene B formed in the second polymerization stage, but is instead the viscosity number of the mixture of polymer A plus polymer B. According to the invention, $VN_2$ is in the range from 200 to 400 cm$^3$/g, in particular from 250 to 350 cm$^3$/g.

The viscosity number $VN_3$ measured on the polymer after the third polymerization stage does not correspond to $VN_C$ for the ultrahigh molecular weight copolymer C formed in the third polymerization stage, which can likewise only be determined mathematically, but is instead the viscosity number of the mixture of polymer A, polymer B plus polymer C. According to the invention, $VN_3$ is in the range from 200 to 600 cm$^3$/g, in particular from 250 to 550 cm$^3$/g, particularly preferably from 350 to 490 cm$^3$/g.

The polyethylene can be obtained by polymerization of the monomers in suspension at temperatures in the range from 70 to 100° C., preferably from 75 to 90° C., at a pressure in the range from 2 to 10 bar and in the presence of a highly active Ziegler catalyst which is composed of a transition metal compound and an organoaluminum compound. The polymerization can be carried out in three stages, i.e. in three successive stages, whereby the molecular mass in each step being regulated by means of a molar mass regulator, preferably by the presence of hydrogen.

In particular, the polymerization process is preferably carried out with the highest hydrogen concentration being set in the first reactor. In the subsequent, further reactors, the hydrogen concentration is preferably gradually reduced, so that the hydrogen concentration used in the third reactor is lower with respect to hydrogen concentration used in the second reactor. Preferably, in the second reactor and in the third reactor, a predetermined co-monomer concentration is used, preferably increasing from the second reactor to the third reactor. As stated above, in the stages where a copolymer fraction is prepared, preferably in the second reactor and in the third reactor, ethylene is thus used as monomer and an olefin having from 4 to 8 carbon atoms is preferably used as co-monomer.

The molecular mass distribution of the polyethylene molding composition of the present invention is preferably trimodal. In this way, it is possible to obtain the above-mentioned advantageous combination of properties without excessively complicating the production process by providing three reactors in series, thereby advantageously keeping the dimensions of the plant in a somehow limited size. Thus, in order to prepare a trimodal polyethylene molding composition, the polymerization of ethylene is preferably carried out in a continuous process performed in three reactors connected in series, wherein different reaction conditions are respectively set in the three reactors. Preferably, the polymerization is performed in suspension: in the first reactor, a suitable catalyst, for example a Ziegler catalyst, is preferably fed in together with suspension medium, co-catalyst, ethylene and hydrogen.

Preferably, any co-monomer is not introduced in the first reactor. The suspension from the first reactor is then transferred to a second reactor in which ethylene, hydrogen and preferably also some predetermined amount of co-monomer, for example 1-butene, is added. The amount of hydrogen fed in the second reactor is preferably reduced compared to the amount of hydrogen fed in the first reactor. The suspension from the second reactor is transferred to the third reactor. In the third reactor, ethylene, hydrogen and, preferably, a predetermined amount co-monomer, for example 1-butene, preferably in an amount higher than the amount of co-monomer used in the second reactor, is introduced. The amount of hydrogen in the third reactor is reduced compared to the amount of hydrogen in the second reactor. From the polymer suspension leaving the third reactor the suspension medium is separated and the resulting polymer powder is dried and then preferably pelletized.

The polyethylene is obtained by polymerization of the monomers, for example in suspension, preferably at temperatures in the range from 70 to 90° C., preferably from 80 to 90° C., at a preferred pressure in the range from 2 to 20 bar, preferably from 2 to 10 bar. The polymerization is preferably carried out in the presence of a suitable catalyst, for example a Ziegler catalyst, preferably sufficiently active to ensure a predetermined productivity of multistage process and preferably hydrogen sensitive. The Ziegler catalyst is preferably composed of a transition metal compound and an organoaluminum compound.

The preferred trimodality, i.e. the preferred trimodal configuration of the molecular mass distribution curve, can be described in terms of the position of the centers of gravity of the three individual molecular mass distributions by means of the viscosity numbers VN in accordance with ISO/R 1191 of the polymers obtained after each polymerization stages.

The low molecular weight ethylene homopolymer A is preferably formed in the first polymerization step: in this preferred embodiment, the viscosity number $VN_1$ measured on the polymer obtained after the first polymerization step is the viscosity number of the low molecular weight ethylene homopolymer A and is preferably in the range from 50 to 150 cm$^3$/g, more preferably from 60 to 120 cm$^3$/g, in particular from 65 to 100 cm$^3$/g.

According to alternative embodiments, either the high molecular weight ethylene copolymer B or the ultrahigh molecular weight copolymer C may be formed in the first polymerization step.

The high molecular weight ethylene copolymer B is preferably formed in the second polymerization step.

According to a particularly preferred embodiment, in which the low molecular weight ethylene homopolymer A is formed in the first polymerization step and the high molecular weight ethylene copolymer B is formed in the second polymerization step, the viscosity number $VN_2$ measured on the polymer obtained after the second polymerization step is the viscosity number of the mixture of the low molecular weight ethylene homopolymer A and of the high molecular weight ethylene copolymer B. $VN_2$ is preferably in the range from 70 to 180 cm$^3$/g, more preferably from 90 to 170 cm$^3$/g, in particular from 100 to 160 cm$^3$/g.

In this preferred embodiment, starting from these measured values of $VN_1$ and $VN_2$, the viscosity number $VN_B$ of the high molecular weight ethylene copolymer B can be for example calculated from the following empirical formula:

$$VN_B = \frac{VN_2 - w_1 \cdot VN_1}{1 - w_1}$$

where $w_1$ is the proportion by weight of the low molecular weight ethylene homopolymer formed in the first polymerization step, measured in % by weight, based on the total weight of the polyethylene having a bimodal molecular weight distribution formed in the first two steps.

The ultrahigh molecular weight ethylene copolymer C is preferably formed in the third polymerization step: in this preferred embodiment, as well as in the alternative embodiments where a different order of polymerization is provided, the viscosity number $VN_3$ measured on the polymer obtained after the third polymerization step is the viscosity number of the mixture of the low molecular weight ethylene homopolymer A, of the high molecular weight ethylene copolymer B and of the ultrahigh molecular weight ethylene copolymer C. $VN_3$ is preferably within the preferred ranges already defined above, i.e. from 150 to 300 cm³/g, preferably from 150 to 280 cm³/g, more preferably in the range from 180 to 260 cm³/g, in particular in the range from 180 to 240 cm³/g.

In this preferred embodiment, starting from these measured values of $VN_2$ and $VN_3$, the viscosity number $VN_C$ of the ultrahigh molecular weight copolymer C formed in the third polymerization step can be for example calculated from the following empirical formula:

$$VN_C = \frac{VN_3 - w_2 \cdot VN_2}{1 - w_2}$$

where $w_2$ is the proportion by weight of the polyethylene having a bimodal molecular weight distribution formed in the first two steps, measured in % by weight, based on the total weight of the polyethylene having a trimodal molecular weight distribution formed in all three steps.

Although the way to calculate the viscosity numbers of each ethylene polymer fraction of the polyethylene molding composition has been given with reference to a preferred case in which the low molecular weight ethylene homopolymer A, the high molecular weight copolymer B and, respectively, the ultra high molecular weight copolymer C are obtained in this order, this calculation method may applied also to different polymerization orders. In any case, in fact, independently from the order of production of the three ethylene polymer fractions, the viscosity number of the first ethylene polymer fraction is equal to the viscosity number $VN_1$ measured on the ethylene polymer obtained after the first polymerization step, the viscosity number of the second ethylene polymer fraction can be calculated starting from the proportion by weight $w_1$ of the first ethylene polymer fraction formed in the first polymerization step, measured in % by weight, based on the total weight of the polyethylene having a bimodal molecular weight distribution formed in the first two steps and from the viscosity numbers $VN_1$ and $VN_2$ measured on the polymers obtained after the second and, respectively, the third polymerization step, while the viscosity number of the third ethylene polymer fraction can be calculated starting from the proportion by weight $w_2$ of the polyethylene having a bimodal molecular weight distribution formed in the first two steps, measured in % by weight, based on the total weight of the polyethylene having a trimodal molecular weight distribution formed in all three steps and from the viscosity numbers $VN_2$ and $VN_3$ measured on the polymers obtained after the second and, respectively, the third polymerization step.

The polyethylene molding composition of the invention can further comprise additional additives in addition to the polyethylene. Such additives are, for example, heat stabilizers, antioxidants, UV absorbers, light stabilizers, metal deactivators, peroxide-destroying compounds, basic co-stabilizers in amounts of from 0 to 10% by weight, preferably from 0 to 5% by weight, but also carbon black, fillers, pigments, flame retardants or combinations of these in total amounts of from 0 to 50% by weight, based on the total weight of the mixture.

The molding composition of the invention is particularly suitable for the production of pipes.

The molding composition of the invention can be processed particularly well by the extrusion process to produce pipes and has a notched impact toughness (ISO) in the range from 8 to 14 kJ/m² and an environmental stress cracking resistance (ESCR) of >500 h.

The notched impact toughness$_{ISO}$ is measured in accordance with ISO 179-1/1eA/DIN 53453 at −30° C. The dimensions of the specimen are 10×4×80 mm, with a V-notch having an angle of 45% a depth of 2 mm and a radius at the base of the notch of 0.25 mm being made in the specimen.

The environmental stress cracking resistance (ESCR) of the molding composition of the invention is determined by an internal measurement method and is reported in h. This laboratory method is described by M. Fleißner in Kunststoffe 77 (1987), p. 45 ff, and corresponds to ISO/CD 16770 which has come into force since. The publication shows that there is a relationship between the determination of the slow crack growth in the creep test on circumferentially notched test bars and the brittle branch of the long-term pressure test in accordance with ISO 1167. A shortening of the time to failure is achieved by shortening the crack initiation time by means of the notch (1.6 mm/razor blade) in 2% strength aqueous Arkopal solution as environmental stress-cracking-promoting medium at a temperature of 80° C. and a tensile stress of 4 MPa. The specimens are produced by sawing three test specimens having dimensions of 10×10×90 mm from a pressed plate having a thickness of 10 mm. The test specimens are notched around the circumference in the middle by means of a razor blade in a notching apparatus constructed in-house for this purpose (see FIG. 5 of the publication). The notch depth is 16. mm.

EXAMPLE 1

The polymerization of ethylene was carried out in a continuous process in three reactors connected in series. A Ziegler catalyst which had been prepared by the method of WO 91/18934, Example 2 and has the operations number 2.2 in the WO document, was introduced into the first reactor in an amount of 15.6 mmol/h together with sufficient suspension medium (hexane), triethylaluminum as co-catalyst in an amount of 240 mmol/h, ethylene and hydrogen. The amount of ethylene (=68.9 kg/h) and the amount of hydrogen (=62 g/h) were set so that a content of 24% by volume of ethylene and a content of 66.5% by volume of hydrogen were measured in the gas space of the first reactor; the remainder was a mixture of nitrogen and vaporized suspension medium.

The polymerization in the first reactor was carried out at a temperature of 84° C.

The suspension from the first reactor was then transferred to a second reactor in which the content of hydrogen in the gas space had been reduced to 0.7% by volume and into which an amount of 43.2 kg/h of ethylene together with an amount of 1470 g/h of 1-butene were fed. The reduction in the amount of hydrogen was achieved by means of an $H_2$ intermediate depressurization. 73.5% by volume of ethylene, 0.7% by volume of hydrogen and 4.8% by volume of 1-butene were measured in the gas space of the second reactor; the remainder was a mixture of nitrogen and vaporized suspension medium.

The polymerization in the second reactor was carried out at a temperature of 85° C.

The suspension from the second reactor was transferred via a further $H_2$ intermediate depressurization, by means of which the amount of hydrogen in the gas space in the third reactor was set to 0% by volume, to the third reactor.

An amount of 24.3 kg/h of ethylene together with an amount of 475 g/h of 1-butene were fed into the third reactor. A content of ethylene of 72% by volume, a content of hydrogen of 0% by volume and a content of 1-butene of 5.3% by volume were measured in the gas space of the third reactor; the remainder was a mixture of nitrogen and vaporized suspension medium.

The polymerization in the third reactor was carried out at a temperature of 84° C.

The long-term activity of the polymerization catalyst required for the cascaded mode of operation described above was achieved by means of a specially developed Ziegler catalyst having the composition indicated in the WO document mentioned at the outset. A measure of the usability of this catalyst is its extremely high response to hydrogen and its high activity which remains constant over a long period of from 1 to 8 hours.

The suspension medium was separated off from the polymer suspension leaving the third reactor, the powder was dried and the powder was passed to pelletization.

A pipe having the dimensions 110×10 mm was produced from the pelletized material on a pipe extrusion unit from Battenfeld at an output of 200 kg/h and a melt temperature of 212° C. The pipes produced in this way had completely smooth surfaces.

The viscosity numbers and the proportions $w_A$, $w_B$ and $w_C$ of polymer A, B and C for the polyethylene molding composition prepared as described in Example 1 are reported in Table 1 below.

TABLE 1

| Example | 1 |
|---|---|
| $W_A$ [% by weight] | 50 |
| $W_B$ [% by weight] | 32 |
| $W_C$ [% by weight] | 18 |
| $VN_1$ [cm$^3$/g] | 80 |
| $VN_2$ [cm$^3$/g] | 305 |
| $VN_{tot}$ [cm$^3$/g] | 450 |
| FNCT [h] | 3100 |
| MFR [g/10 min] | 0.32 |
| Density [g/cm$^3$] | 0.947 |
| Tensile creep test (5 MPa/23° C.), elongation in [%] | 1.72 |
| ACN [kJ/m$^2$] | 13.7 |

The abbreviations for the physical properties in Tables 1 and 2 have the following meanings:

FNCT=environmental stress cracking resistance (Full Notch Creep Test) measured by the internal measurement method described by M. Fleiβner in [h], conditions: 80° C., 4.0 MPa, water/2% of Arkopal.

ACN=notched impact toughness$_{ISO}$ in accordance with ISO 179-1/1eA/DIN 53453 at −30° C., reported in the unit kJ/m$^2$.

Tensile creep test in accordance with DIN EN ISO 899 at 23° C. and a tensile stress of 5 MPa; the figure reported is the elongation in % after 96 h.

COMPARATIVE EXAMPLE

The polymerization of ethylene was carried out in a continuous process in two reactors connected in series. The same Ziegler catalyst as in Example 1, which had been prepared by the method of WO 91/18934, Example 2, and has the operations number 2.2 in the WO document, was fed into the first reactor in an amount of 15.6 mmol/h together with sufficient suspension medium (hexane), triethylaluminum as cocatalyst in an amount of 240 mmol/h, ethylene and hydrogen. The amount of ethylene (=68.9 kg/h) and the amount of hydrogen (=62 g/h) were set so that a content of 24% by volume of ethylene and a content of 66.5% by volume of hydrogen were measured in the gas space of the first reactor; the remainder was a mixture of nitrogen and vaporized suspension medium.

The polymerization in the first reactor was carried out at a temperature of 84° C.

The suspension from the first reactor was then transferred to a second reactor in which the content of hydrogen in the gas space had been reduced to 0.7% by volume and into which an amount of 76.1 kg/h of ethylene together with an amount of 2300 g/h of 1-butene were fed. The reduction in the amount of hydrogen was achieved by means of an H$_2$ intermediate depressurization. 78% by volume of ethylene, 0.7% by volume of hydrogen and 6% by volume of 1-butene were measured in the gas space of the second reactor; the remainder was a mixture of nitrogen and vaporized suspension medium.

The polymerization in the second reactor was carried out at a temperature of 84° C.

The long-term activity of the polymerization catalyst required for the cascaded mode of operation described above was properly achieved by means of the Ziegler catalyst having the composition indicated in the afore-mentioned WO document. Another advantage of this catalyst is its extremely high response to hydrogen and its high activity which remains constant over a long period of from 1 to 8 hours.

The suspension medium was separated off from the polymer suspension leaving the second reactor, the powder was dried and the powder was passed to pelletization.

A pipe having the dimensions 110×10 mm was produced from the pelletized material on a pipe extrusion unit from Battenfeld. The pipe surfaces were completely smooth.

The viscosity numbers and the proportions $w_A$, $w_B$ and $w_C$ of polymer A and B for the bimodal polyethylene molding composition in the comparative example are reported in Table 2 below.

TABLE 2

| Comparative example | |
|---|---|
| $W_A$ [% by weight] | 47.5 |
| $W_B$ [% by weight] | 52.5 |
| $VN_1$ [cm$^3$/g] | 80 |
| $VN_2$ [cm$^3$/g] | 370 |
| FNCT (4 MPa/80° C., water/2% of Arkopal solution) [h] | 1270 |
| Tensile creep test (5 MPa/23° C.), elongation in [%] | 1.67 |
| MFR (190/5) [g/10 min] | 0.32 |
| ACN (−30° C.) [kJ/m$^2$] | 12.3 |
| Density [g/cm$^3$] | 0.948 |

Comparison with Example 1 makes it clear that the bimodal PE of the comparative example has significantly poorer mechanical properties, expressed as FNCT (=environmental stress cracking resistance) and ACN (=notched impact toughness), despite the same catalyst, despite a slightly higher density and despite the same MFR. This was very surprising and may well be attributable to a change in the polymeric microstructure of the raw material according to the invention having a trimodal molar mass distribution.

The invention claimed is:

1. A polyethylene molding composition comprising:
   (A) 45 to 55% by weight, based on a total weight of the polyethylene molding composition, of a low molecular weight ethylene homopolymer A having a viscosity number $VN_1$ from 50 to 120 cm$^3$/g,
   (B) 20 to 40% by weight, based on a total weight of the polyethylene molding composition, of a high molecular weight copolymer B comprising ethylene and from 1 to 8% by weight of another olefin comprising from 4 to 8 carbon atoms, based on the weight of the high molecular weight copolymer B, wherein the mixture of homopolymer A and copolymer B has a viscosity number $VN_2$ of 200 to 400 cm$^3$/g, and
   (C) 15 to 30% by weight, based on a total weight of the polyethylene molding composition, of an ultrahigh molecular weight ethylene copolymer C,
   wherein the polyethylene molding composition:
   (i) has an environmental stress cracking resistance (ESCR) greater than 2500 hours
   (ii) has a viscosity number $VN_3$ from 350 to 490 cm$^3$/g,
   (iii) has a density between 0.945 and 0.955 g/cm$^3$,
   (iv) has a melt flow index, $MFI_{190/5}$, ranging from 0.1 to 0.5 dg/min,
   (v) has a trimodal molecular weight distribution, and
   (vi) has a notched impact toughness from 8 to 14 kJ/m$^2$ measured at −30° C.

2. The polyethylene molding composition according to claim 1, wherein the ultrahigh molecular weight ethylene copolymer C comprises from 1 to 8% by weight of one or more comonomers comprising from 4 to 8 carbon atoms, based on a weight of the ultrahigh molecular weight ethylene copolymer C.

3. A process comprising extruding the molding composition of claim 1 to form a pipe.

4. A pipe comprising a polyethylene molding composition comprising:
   (A) 45 to 55% by weight, based on a total weight of the polyethylene molding composition, of a low molecular weight ethylene homopolymer A having a viscosity number $VN_1$ from 50 to 120 cm$^3$/g,
   (B) 20 to 40% by weight, based on a total weight of the polyethylene molding composition, of a high molecular weight copolymer B comprising ethylene and from 1 to 8% by weight of another olefin comprising from 4 to 8 carbon atoms, based on the weight of the high molecular weight copolymer B, wherein the mixture of homopolymer A and copolymer B has a viscosity number $VN_2$ of 200 to 400 cm$^3$/g, and
   (C) 15 to 30% by weight, based on a total weight of the polyethylene molding composition, of an ultrahigh molecular weight ethylene copolymer C,
   wherein the polyethylene molding composition:
   (i) has an environmental stress cracking resistance (ESCR) greater than 2500 hours,
   (ii) has a viscosity number $VN_3$ from 350 to 490 cm$^3$/g,
   (iii) has a density between 0.945 and 0.955 g/cm$^3$
   (iv) has a melt flow index, $MFI_{190/5}$, ranging from 0.1 to 0.5 dg/min,
   (v) has a trimodal molecular weight distribution, and
   (vi) has a notched impact toughness from 8 to 14 kJ/m$^2$ measured at −30° C.

* * * * *